Nov. 28, 1967
J. J. PASTORIZA
3,355,670
HIGH-SPEED SWITCHING APPARATUS
Filed March 10, 1964
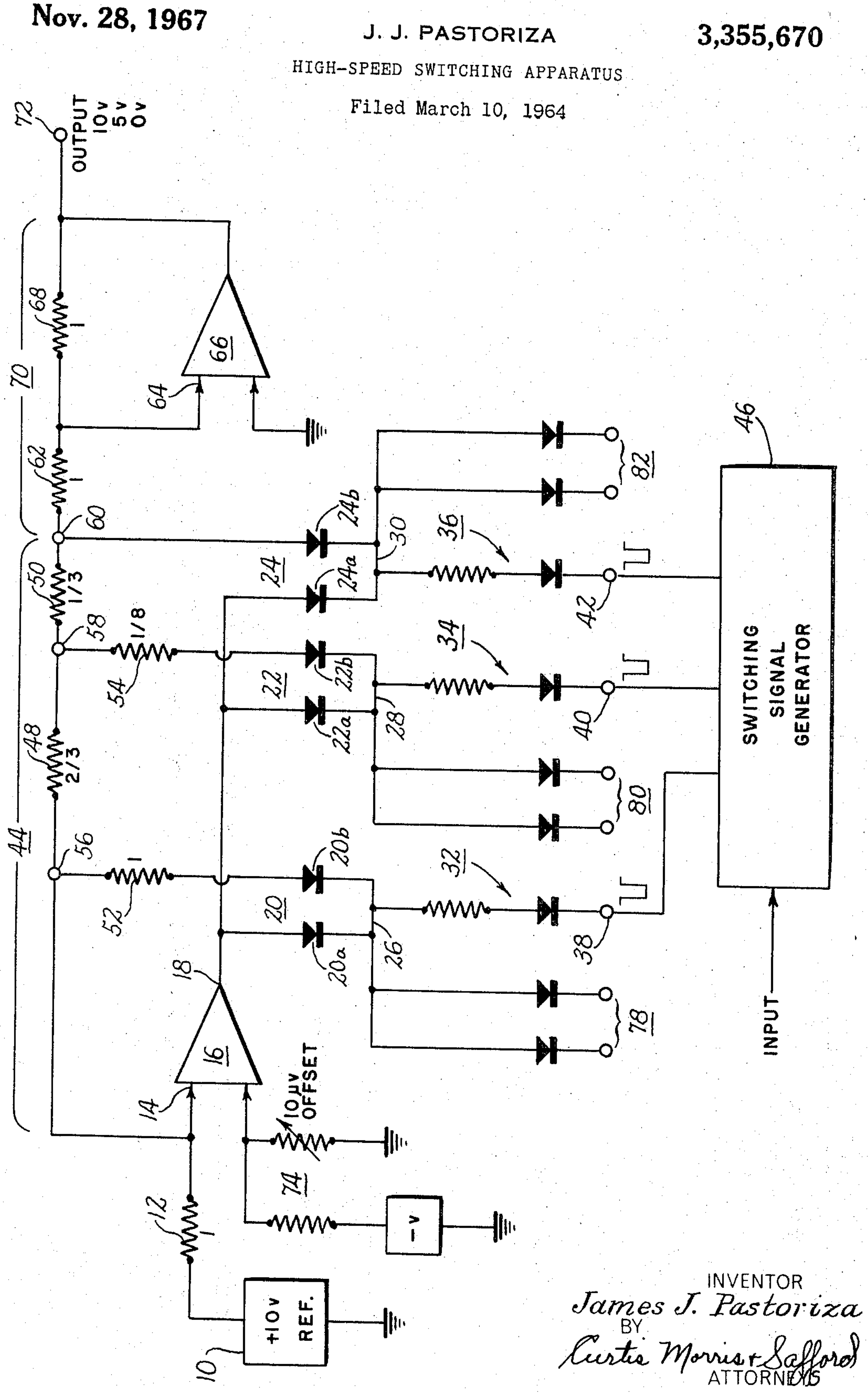
INVENTOR
James J. Pastoriza
BY
Curtis Morris & Safford
ATTORNEYS

United States Patent Office 3,355,670

Patented Nov. 28, 1967

3,355,670

HIGH-SPEED SWITCHING APPARATUS

James J. Pastoriza, Old Farm Road, Lincoln, Mass. 01773

Filed Mar. 10, 1964, Ser. No. 350,734
7 Claims. (Cl. 330—9)

This invention relates to high-speed electronic switching apparatus. More particularly, this invention relates to electronic switching apparatus used for generating signals of different voltage levels.

In certain kinds of electrical systems, it often is advantageous to convert from binary signals to corresponding signals having a precisely-determined magnitude. Of this class of signal converters, those which are adapted to produce outputs of three or four levels are perhaps the most useful. In the past, such converters have not been entirely satisfactory; for example, they have required a relatively large number of parts, or they were unable to hold the output signal magnitudes within sufficiently close tolerances.

In an embodiment of the present invention, there is provided an apparatus including high-speed electronic switch means for selectively generating output signals of three different voltage levels. This apparatus operates with speed and precision, yet requires only a modest number of conventional parts.

Accordingly, it is an obect of this invention to provide improved signal generating apparatus. A more specific object of this invention is to provide a high-speed signal converter adapted to produce selectively any one of several precisely-regulated voltage levels. Other objects, aspects and advantages of the invention will in part be pointed out in, and in part apparent from, the following description considered together with the accompanying drawing which presents a schematic diagram of a preferred construction embodying this invention.

Referring now to the left-hand side of the drawing, there is shown a reference signal power supply 10 the positive output of which is connected through a resistor 12 to the input 14 of a high-gain operational amplifier 16. The output 18 of this amplifier is connected to three diodes 20*a*, 22*a* and 24*a* each of which is connected in a back-to-back arrangement to a corresponding diode 20*b*, 22*b* and 24*b*. The junctions 26, 28 and 30 between these diode pairs are connected through respective isolating resistor-and-diode circuits 32, 34 and 36 to the control input terminals 38, 40 and 42.

Each of the diode pairs 20, 22 and 24 serves as a high-speed electronic switch adapted to connect the amplifier output 18 to a negative feedback circuit 44 when the corresponding control terminal 38, 40 or 42 is activated. These terminals are activated by negative pulses derived from a switching signal generator 46, which may be of any conventional construction. The control pulse produced by this generator is more negative than the negative output of the amplifier 16, and thus serves to place the corresponding diode pairs 20, 22 and 24 into their conductive regions so as to connect the amplifier output 18 through a selected portion of the feedback circuit 44 to the input 14 of the amplifier.

The feedback circuit 44 comprises a network having, in the present embodiment, two series-connected resistors 48 and 50. The diode pair switches 20 and 22 are connected through respective resistors 52 and 54 to corresponding terminals 56 and 58 of the feedback network, while the remaining diode pair switch 24 is connected directly to output terminal 60 of the network. Terminal 60 is connected through another resistor 62 to the input 64 of a second operational amplifier 66 having a negative feedback resistor 68 which, together with resistor 62, is identified in the drawing as network 70. The various resistors in the network 44 and 70 are so proportioned relative to one another, and to the input resistor 12, as to provide at amplifier output terminal 72 voltages of desired level in accordance with which of the control terminals 38, 40 and 42 is activated.

The proportioning of the various resistors in the present embodiment, as indicated by numbers adjacent each resistor, is fixed to provide precise output levels of 0, 5 or 10 volts when the reference supply 10 is plus 10 volts. For example, if the first control terminal 38 is activated, the feedback connection is from amplifier output 18 through switch 20, resistor 52, terminal 56 and thence to input 14. Since input 14 is the "summing junction" of the amplifier, its potential is effectively zero, and the amplifier output is −10 volts because resistors 52 and 12 have a 1:1 relationship. A D-C offset compensation preferably also is provided as indicated at 74, so that the summing at input 14 is actually at ground instead of being offset by an amount equal to 10 volts divided by the gain of the amplifier.

Since input 14 is at zero volts, network terminal 56 also will be zero. Switches 22 and 24 are, of course, open at this time, and consequently essentially no current flows through resistors 48 and 50. Therefore, terminal 60 is at zero volts, so that the output 72 of the apparatus also is zero volts.

If the second control terminal 40 is activated, diode switch 22 closes to connect amplifier output 18 through resistor 54, terminal 58 and resistor 48 back to input 14. Since switch 20 is open at this time, the current through resistor 48 will essentially be the same as the current through input resistor 12, and thus it will be evident that the potential at terminal 58 will be −20/3 volts. Similarly, since switch 24 also is open, the current through resistors 50 and 62 will be equal, and will be the same as the current through feedback resistor 68. Accordingly, since the summing junction at the amplifier input 64 will be held by feedback essentially at ground potential, the voltage of −20/3 at terminal 58 will produce an output signal of plus 5 volts at the output terminal 72, due to the indicated proportional relationship between resistors 50, 62 and 68.

If switch 24 now is activated, and the other switches 20 and 22 opened, the current through resistors 48 and 50 will be equal, and will be essentially the same as the current through input resistor 12. Since the two resistors 48 and 50 have a combined ohmic resistance equal to that of the input resistor 12, the potential of terminal 60 will be −10 volts. Consequently, with the input 64 of amplifier 66 held at zero due to feedback action, and with the current through resistors 62 and 68 equal, the voltage on output terminal 72 will be plus 10 volts.

The circuit parameters are so fixed that the output 18 of amplifier 16 is held to approximately −10 volts regardless of which switch 20, 22 or 24 is actuated. In addition, the control terminals 38, 40 and 42 are activated by control signals having identical waveforms. These two factors, as well as the offset compensator 74, tend to minimize any changes in output voltage on terminal 72 which might result from gain changes in the amplifier 16, e.g. due to temperature variations.

With the back-to-back diode switch arrangement disclosed, the only error introduced by these switches is the possible mismatch of the two diodes in each pair. This mismatch can be held to quite small tolerances, and moreover the effects of such mismatch is considerably reduced by the automatic compensation produced by the feedback action of the amplifier 16. For the usual amplifier having a gain of between 10,000 and 100,000, this error should be less than a microvolt.

Any error introduced by the open switches 20, 22 or 24 is a function of the current contributed as a result of leakage across the respective switch diodes. The back current of a diode will normally be below $10^{-9}$ amps, so that any error due to this cause will ordinarily not be significant. If it is desired to reduce this error still further, means can be provided to maintain the voltage across the diodes to below 0.5 volt, thus holding the leakage current to less than $10^{-11}$ amps. To illustrate such an arrangement, compensating circuits 78, 80 and 82 are shown connected to the respective switch junctions 26, 28 and 30. The compensating circuits for the open switches may be energized by suitable signals (e.g. produced by the signal generator 46) so as to hold the switch diodes approximately at the potential of the point which they would leak to.

Although a specific embodiment of the invention has been set forth in detail, it is desired to emphasize that this is not intended to be exhaustive or necessarily limitative. For example, it is evident that a larger number of output levels can readily be obtained by adding resistors to the feedback network 44, and by providing additional switches and control terminals. Thus, the showing herein is for the purpose of illustrating the invention so as to enable others skilled in the art to adapt the invention in such ways as meet the requirements of particular applications, it being understood that various modifications may be made without departing from the scope of the invention as limited by the prior art.

I claim:

1. High-speed multi-level signal-generating apparatus comprising: an operational amplifier having input and output circuits; D-C reference signal supply means coupled to the input circuit of said amplifier to apply a fixed magnitude signal thereto; a negative feedback circuit including a network consisting of a group of series resistors, one end of said group being connected to said amplifier input circuit and the other end serving as an output terminal; a plurality of electronic switches having respective control terminals, said switches being independently operable from off to on in response to control signals applied to the control terminals respectively, means connecting one side of each switch to the output circuit of said amplifier; and a plurality of circuit means connecting the other sides of said switches to respective terminals of said series resistors, whereby the particular combination of resistors connected in the feedback path of said amplifier is determined by the selective activation of said switch control terminals.

2. High-speed multi-level signal-generating apparatus adapted to produce output signals having magnitudes determined by the selected activation of any one of a plurality of control terminals, said apparatus comprising: an operational amplifier; an input impedance having one end connected to the input of said amplifier; D-C reference signal supply means connected to the other end of said input impedance to apply a fixed magnitude input signal thereto; a negative feedback circuit connected to said amplifier input, said feedback circuit including a network of impedance elements interconnected at junction points, said network being constructed and arranged to provide different amounts of impedance between each of said junction points and said amplifier input; a plurality of electronic switches each having a control terminal and operable from off to on condition in response to control signals applied to said control terminals respectively, each of said switches including circuit means to connect the output of said operational amplifier to a respective junction point in said feedback network and an output circuit connected to one point of said network to furnish an output signal the magnitude of which is determined by the particular selected combination of said impedance elements connected in said feedback circuit.

3. High-speed multi-level signal-generating apparatus comprising: an operational amplifier; an input resistor connected at one end to the input of said amplifier; D-C reference signal supply means coupled to the other end of said input resistor to apply to the input of said amplifier a fixed magnitude reference signal; a negative feedback circuit including a network consisting of a group of series resistors, one end of said group being connected to said amplifier input and the other end serving as an output terminal; a plurality of electronic switches each having a control terminal, said switches being independently operable from off to on conditions in response to control signals applied to respective control terminals, one side of each switch being connected to the output of said amplifier; a plurality of circuit means connecting the other sides of said switches to respective terminals of said series resistors, whereby the particular combination of resistors connected in the feedback path of said amplifier is determined by the selective activation of said control terminals; and an output circuit connected to said output terminal and adapted to furnish an output signal having a magnitude responsive to the particular combination of said resistors connected in said feedback circuit by the selected one of said switches.

4. High-speed multi-level signal-generating apparatus comprising: an operational amplifier; D-C reference signal supply means coupled to the input of said amplifier to apply a fixed magnitude input signal thereto; a negative feedback circuit including a network consisting of a group of series resistors having ohmic resistances related in accordance with predetermined proportions, one end of said group being connected to said amplifier input and the other end serving as an output terminal; a plurality of electronic switches each having a control terminal, said switches being independently operable from off to on condition in response to control signals applied to respective control terminals, one side of each switch being connected to the output of said amplifier; and a plurality of circuit means connecting the other sides of said switches to respective terminals of said series resistors, whereby the particular combination of resistors connected in the feedback path of said amplifier is determined by the selective activation of said control terminals, at least one of said circuit means including a series resistor between the associated switch and the corresponding terminal of said series resistors.

5. High-speed multi-level signal-generating apparatus comprising: an operational amplifier; D-C reference signal supply means coupled to the other end of said input resistor to apply a fixed magnitude reference signal to said operational amplifier; a negative feedback circuit including a network consisting of a group of series resistors, one end of said group being connected to said amplifier input; a plurality of electronic switches each comprising a pair of diodes connected back-to-back at a common junction, one side of each switch being connected to the output of said amplifier; a plurality of control circuits each connected to the common junction of a corresponding one of said diode switches and adapted to be activated by a control pulse, a plurality of circuit means connecting the other sides of said diode switches to respective terminals of said series resistors, whereby the particular combination of resistors connected in the feedback path of said amplifier is determined by the selective activation of said control circuits; and an output circuit connected to the other end of said group of series resistors to develop an output signal having a magnitude responsive to the particular combination of said resistors connected in said feedback circuit by the selected one of said diode switches.

6. Apparatus as claimed in claim 5, including a plurality of compensating circuits each connected to the common junction of a corresponding one of said diode switches, each compensating circuit being adapted to supply to its junction a compensating voltage to minimize the diode leakage current when the respective diode switch is open.

7. Apparatus as claimed in claim 5, wherein said output circuit includes a second operational amplifier having an input resistor the remote end of which is connected to said other end of said series resistors, and a second negative feedback circuit comprising a resistor connected between the input and output of said second amplifier.

References Cited

UNITED STATES PATENTS

| | | | |
|---|---|---|---|
| 2,361,593 | 10/1944 | Black | 330—86 X |
| 3,153,202 | 10/1964 | Woolam | 330—86 X |
| 3,207,848 | 9/1965 | Bore | 330—86 X |
| 3,209,266 | 9/1965 | White | 330—86 X |

NATHAN KAUFMAN, *Examiner.*

ROY LAKE, *Primary Examiner.*